May 29, 1934. L. G. SEWELL ET AL 1,960,756
PRODUCTION OF HYDRATED LIME
Filed Nov. 1, 1933
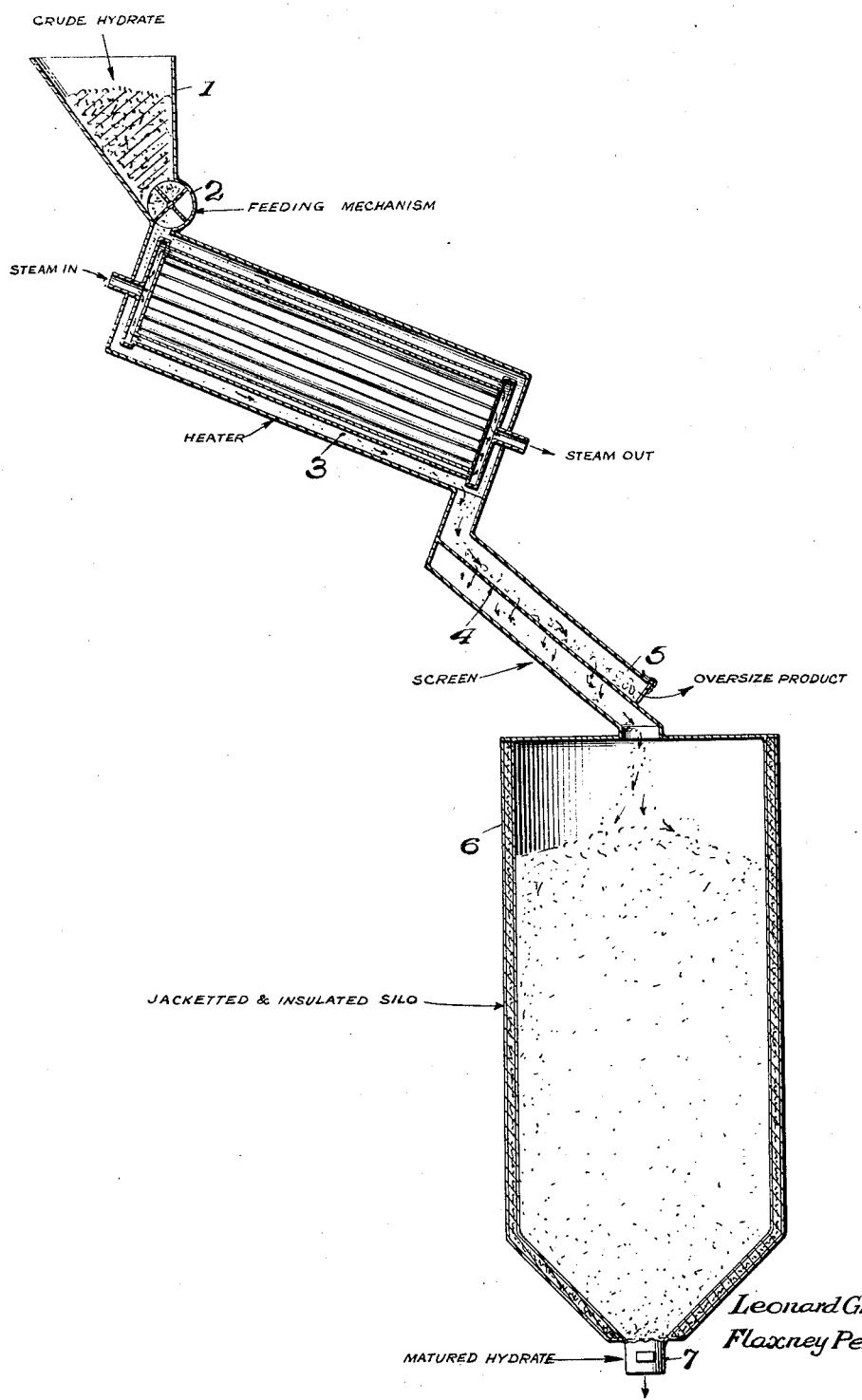

Patented May 29, 1934

1,960,756

UNITED STATES PATENT OFFICE 1,960,756

PRODUCTION OF HYDRATED LIME

Leonard Greville Sewell and Flaxney Percival Stowell, Buxton, England, assignors to Imperial Chemical Industries Limited, a corporation of Great Britain Application November 1, 1933, Serial No. 696,254
In Great Britain September 27, 1932

4 Claims. (Cl. 23—188)

This invention relates to an improved method of producing hydrated lime, and specifically to an improved process for maturing hydrated lime.

When quicklime is hydrated to a powder, there are present in the resulting product (in addition to hydrated lime) particles of unhydrated lime, compounds of lime with silica, alumina and the like, and, especially if the lime is very reactive, particles of "water-burnt" lime. The latter is produced through unavoidable local overheating during hydration.

All these particles are for most purposes definitely deleterious in the finished hydrate. In plaster work they may react after the plaster has been applied, and, through expansion, push out the surface in front of them, causing the appearance or the well known blisters or "pops" in the finished plaster. These blisters also occur when unsound hydrated lime has been used in sand-lime brick manufacture, the unstable compounds decomposing during autoclaving, and blistering the face of the brick. In various chemical processes also, the presence of these compounds is deleterious, both to the efficiency of the process and to the stability of the resultant product. For example, the uneven distribution of the excess water in freshly hydrated lime affects the reactivity of the latter in the manufacture of bleaching powder.

The object of the invention is to produce a sound hydrated lime, free from the said deleterious ingredients, in a shorter period of time than has hitherto been possible.

It is known that when hydrated lime is stored in bulk at normal temperatures, there is a progressive improvement in the soundness of the material with lapse of time. This is due to the fact that hydrated lime as commonly made contains a slight excess of free or uncombined water (generally 1-2 per cent.) which combines with the unchanged quicklime and other unsound particles while the hydrate is being matured. Hitherto it has been found that a minimum period of four to five weeks has been necessary for the complete maturing of hydrated lime at normal temperatures.

We have now found that the crude hydrated lime may be matured much more rapidly at raised temperatures, i. e. at 80° C. or over, provided that care is taken to ensure the presence of a few per cent. of free water throughout the operation. This temperature usually exceeds the temperature of the hydrated lime at the conclusion of the slaking operation, and in any case must be maintained for considerably longer than would be possible if the normal practice in the art as to storing were followed. The minimum maturing time necessary to produce a sound hydrated lime depends on the quality of the initial lime and upon the temperature of maturing. Thus for a normal hydrated lime containing say 95% of $Ca(OH)_2$ the minimum maturing time at 80° C. is about 40 hours, and at 110–120° C. about 3½ hours. At temperatures of about 100° C. or over it is, of course, advisable to mature the hydrated lime in a closed vessel in order to prevent the escape of the free water which is initially present and which is required to enable the maturing reactions to proceed. If necessary an addition of water, either as such or in the form of steam, may be made to the crude hydrated lime or to the product at any intermediate stage of the maturing process.

In carrying out our invention, we preferably proceed as follows:—The initial lime is hydrated in the usual way and care is taken that the resulting powder contains free water to the extent of about 4 per cent. by weight. The water content should not materially exceed 4 per cent. otherwise the hydrated lime is apt to be pasty. On the other hand it is advisable to have more water present than is normally left in the crude hydrated lime (1–2 per cent.) in order to make up for unavoidable losses during manipulation and treatment of the hydrated lime. The crude hydrated lime is not necessarily subjected to the usual screening but is raised as quickly as possible, in a sealed vessel, to a temperature of at least 80° C., with stirring to assist the distribution of heat and moisture, and it is then maintained at this temperature and under pressure for a sufficient period of time to produce a sound product satisfying the test hereinafter set forth, while taking care to avoid the loss of free water by volatilization. Once the mass has attained the requisite temperature, stirring may be dispensed with.

The apparatus we provide for carrying out the process comprises a heater adapted to be maintained under pressure, means for feeding crude hydrated lime to the heater, a silo or storage chamber adapted for the storage of the hydrated lime with a minimum loss of heat and pressure, means for extracting hydrated lime from the heater and feeding it to the silo without loss of pressure, and means for withdrawing hydrated lime from the silo without loss of pressure therein. The heater may be tubular and may either rotate or be provided with rotating elements in conjunction with one or more heat-insulated storage chambers or silos. The heater consists of a bundle of steam-heated tubes arranged in a cylinder, and the crude hydrated lime is tumbled in the cylinder and over the tubes until it has reached the requisite temperature, e. g. 110–120° C. This step of the process may be made continuous by feeding the crude lime through suitable valve gear to the upper end of an indirect heater and extracting the heated material at the lower end through suitable valve-gear into the storage chamber or silo.

The material is allowed to rest in the silo for at least the minimum maturing time referred to, during which time loss of heat and pressure is restricted as far as possible. The whole apparatus is maintained under sufficient pressure, e. g. a gauge pressure of up to 30 lbs. per sq. in., to prevent loss of water, and the means for extracting hydrated lime from the heater and feeding it to the silo, and for withdrawing hydrated lime from the silo are such that there is no loss of pressure.

The initial material fed to the heater does not contain sufficient water to cause agglomeration as a result of the mixing which it receives. As a precaution, however, the material leaving the heater may be screened to eliminate any unduly large particles before passing to the silo. It is of great importance to heat the material in such a way that a uniform temperature is obtained, otherwise when it is stored in the silo the water will not be uniformly distributed within the bulk of the material and the maturing process will not take place so satisfactorily. Instead of heating the material indirectly as described above, it is possible to employ direct heating by means of inert gases such as $CO_2$—free air or nitrogen but it should be noted that in practice saturated steam at atmospheric pressure cannot be used in this way as there is always a tendency for condensation to occur in some part of the apparatus and consequently the hydrated lime will be apt to become pasty instead of remaining as a freely blowing powder.

A suitable apparatus for carrying out our invention is illustrated in the accompanying diagrammatic drawing, in which 1, is a hopper from which the crude powdered hydrated lime is fed, through a rotary valve 2, to a heater 3. The heater comprises a bundle of steam heated tubes which is rotated so that the hydrated lime tumbles over the heated surfaces and is quickly raised to the required temperature, e. g. 110–120° C. The heated hydrated lime is discharged on to a screen 4, oversize particles are rejected at 5, while the remainder flows into a jacketed and heat insulated silo 6, where the hydrated lime is allowed to mature for the requisite time. The matured product is withdrawn from the bottom of the silo through a valve 7. If necessary, the jacket of the silo may be steam heated.

The termination of the maturing period may be ascertained by tests made on samples withdrawn from the silo at intervals, although if a standard quality of lime is being used one set of determinations of the maturing periods for various temperatures will enable a safe period of time to be fixed for the storage of the material in the silo and there will be no need to make continual tests.

In order to pass as sound, the hydrated lime should pass the following test:—

A smooth plaster pat is prepared by mixing the hydrated lime with water and a small amount of plaster of Paris (sufficient to cause the mixture to set firmly). Half an hour after adding the plaster of Paris, the pat is dried in an oven at 35–45° C. for about 12 hours and it is then exposed to the action of saturated steam at atmospheric pressure for a period of 3 hours. The pat should show no sign of disintegration, popping or pitting, otherwise the hydrated lime cannot be passed as sound.

After the desired period of storage the matured hydrated lime is subjected to the usual purification and sizing by air sifting or other methods.

The hydrated lime referred to in this specification and in the appended claims means a product obtained by slaking practically pure calcium oxide or calcium oxide containing up to 10 per cent of magnesia such as is obtained by burning magnesium limestone.

We claim:—

1. A process for the production of hydrated lime which includes the steps of hydrating quicklime to an apparently dry powder containing a few per cent. of free water, transferring the powder to a sealed vessel and heating it therein to a temperature of at least 80° C., as uniformly as possible and with stirring to assist the distribution of heat and moisture, and maintaining the hydrated lime at such temperature for a sufficient period of time to produce a sound product while avoiding the loss of free water by volatilization.

2. A process as claimed in claim 1, in which the initial powder contains about 4 per cent. by weight of free water.

3. A process as claimed in claim 1, in which the powder is heated to 110–120° C.

4. A process as claimed in claim 1, in which the powder is maintained under pressure.

LEONARD GREVILLE SEWELL.
FLAXNEY PERCIVAL STOWELL.